US006951009B2

(12) United States Patent
Cerami et al.

(10) Patent No.: US 6,951,009 B2
(45) Date of Patent: Sep. 27, 2005

(54) SYSTEM AND METHOD FOR GENERATING COMPUTER CODE TO FACILITATE DEVELOPMENT OF CDR MANAGEMENT TOOLS

(75) Inventors: Robert E. Cerami, Hoover, AL (US); John D. Ensminger, Homewood, AL (US); Douglas C. Van Natter, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 596 days.

(21) Appl. No.: 10/094,642

(22) Filed: Mar. 12, 2002

(65) Prior Publication Data

US 2003/0176160 A1 Sep. 18, 2003

(51) Int. Cl.⁷ .................................. G06F 9/44
(52) U.S. Cl. .................. 717/100; 717/106; 717/107; 717/108; 379/112.01; 379/121.04
(58) Field of Search ................. 717/100, 106, 717/108, 110, 104, 107; 379/112.01, 115.01, 1.01, 21.04, 88.22

(56) References Cited

U.S. PATENT DOCUMENTS

| | | | |
|---|---|---|---|
| 5,146,491 A | | 9/1992 | Silver et al. |
| 5,325,290 A | * | 6/1994 | Cauffman et al. ............ 705/34 |
| 5,333,183 A | | 7/1994 | Herbert ....................... 379/112 |
| 5,438,570 A | | 8/1995 | Karras et al. ............... 370/94.2 |
| 5,553,131 A | | 9/1996 | Minervino, Jr. et al. |
| 5,579,371 A | | 11/1996 | Aridas et al. .................. 379/34 |
| 5,659,601 A | | 8/1997 | Cheslog |
| 5,675,636 A | | 10/1997 | Gray |
| 5,757,895 A | | 5/1998 | Aridas et al. ............... 379/136 |
| 5,774,532 A | | 6/1998 | Gottlieb et al. ............... 379/11 |
| 5,793,852 A | | 8/1998 | Kang et al. |
| 5,809,507 A | | 9/1998 | Cavanaugh, III ........... 707/103 |
| 5,915,006 A | | 6/1999 | Jagadish et al. |
| 5,920,613 A | | 7/1999 | Alcott et al. |
| 5,925,562 A | | 7/1999 | Nova et al. ............... 435/287.1 |
| 5,930,343 A | | 7/1999 | Vasquez |
| 5,940,487 A | * | 8/1999 | Bunch et al. .......... 379/201.03 |
| 5,963,625 A | | 10/1999 | Kawecki et al. |
| 5,987,107 A | | 11/1999 | Brown |
| 5,987,108 A | | 11/1999 | Jagadish et al. |
| 5,991,376 A | | 11/1999 | Hennessy et al. |
| 5,999,604 A | | 12/1999 | Walter ........................ 379/133 |

(Continued)

OTHER PUBLICATIONS

TITLE: Protection of Call Detail Records Data in Federal Telecommunications, author: Chokhani, IEEE, 1990.*
TITLE: A Flexible Model for Resource Management in Virtual Private Networks, author: Duffield et al, ACM, 1999.*
U.S. Appl. No. 10/094,614, filed Mar. 12, 2002, entitled "System and Method for Ensuring Proper Billing in a Cellular Telephone System", Inventors: Cerami et al.
U.S. Appl. No. 10/094,640, filed Mar. 12, 2002, entitled "System and Method for Managing CDR Information", Inventors: Cerami et al.
U.S. Appl. No. 10/094,641, filed Mar. 12, 2002, entitled "System and Method for Verifying Subscriber Data Records in a Telephone System", Inventors: Cerami et al.

*Primary Examiner*—Chameli C. Das
(74) *Attorney, Agent, or Firm*—Merchant & Gould (57) ABSTRACT

A computer code generation tool generates computer code to facilitate development of call detail record (CDR) management tools. The computer code generation tool inputs one or more raw CDR structures and creates a generic CDR structure therefrom. Given a generic CDR structure and one or more raw CDR structures that it encapsulates, the computer code generation tool generates computer code to read data from the raw CDR(s) stored on disk and store that data in the generic CDR. The computer code generation tool can also generate computer code to generate raw CDRs from the data stored in the generic CDR.

17 Claims, 10 Drawing Sheets

U.S. PATENT DOCUMENTS

| | | | |
|---|---|---|---|
| 6,016,547 A | 1/2000 | Ono .......................... 713/300 |
| 6,028,914 A | 2/2000 | Lin et al. ...................... 379/14 |
| 6,038,555 A | 3/2000 | Field et al. ................... 706/21 |
| 6,052,447 A | 4/2000 | Golden et al. |
| 6,052,448 A * | 4/2000 | Janning ................. 379/115.01 |
| 6,052,449 A | 4/2000 | Chavez, Jr. |
| 6,064,881 A | 5/2000 | Shea et al. .................. 455/427 |
| 6,122,352 A | 9/2000 | Kangas et al. |
| 6,125,173 A | 9/2000 | Jagadish et al. |
| 6,145,005 A | 11/2000 | Kirkby |
| 6,223,035 B1 | 4/2001 | Pierce et al. ................ 455/433 |
| 6,224,477 B1 | 5/2001 | Ho et al. .................... 455/433 |
| 6,249,570 B1 | 6/2001 | Glowny et al. .......... 379/88.22 |
| 6,249,572 B1 | 6/2001 | Brockman et al. .......... 379/133 |
| 6,289,502 B1 * | 9/2001 | Garland et al. ............. 717/104 |
| 6,298,125 B1 | 10/2001 | Goldberg et al. |
| 6,301,471 B1 | 10/2001 | Dahm et al. |
| 6,337,901 B1 | 1/2002 | Rome et al. |
| 6,385,444 B1 | 5/2002 | Peschel et al. .............. 455/405 |
| 6,411,681 B1 * | 6/2002 | Nolting et al. ............. 379/1.01 |
| 6,522,734 B1 | 2/2003 | Allen et al. ............ 379/114.29 |
| 6,539,538 B1 * | 3/2003 | Brewster et al. ............ 717/115 |
| 6,658,099 B2 * | 12/2003 | Perkins, III ............ 379/112.01 |
| 6,745,384 B1 * | 6/2004 | Biggerstaff .................. 717/156 |
| 6,785,370 B2 * | 8/2004 | Glowny et al. .......... 379/88.22 |
| 6,798,871 B2 * | 9/2004 | Richardson ............ 379/114.04 |
| 6,845,500 B2 * | 1/2005 | Ponticelli et al. ........... 717/107 |
| 2002/0176378 A1 | 11/2002 | Hamilton et al. ........... 370/328 |
| 2002/0191597 A1 | 12/2002 | Lundstrom ................. 370/356 |
| 2004/0133487 A1 | 7/2004 | Hanagan et al. .............. 705/34 |

* cited by examiner

```
struct CDR_type1 {
    byte reckind[2];
    byte recnum[2];
    byte calling_num[12];
    byte xyz[3];
    byte date[6];
    time_t time;
}
```
— 102

(PRIOR ART)
FIG. 1A

```
struct CDR_type2 {
    byte reckind[2];
    byte recnum[2];
    byte date[6];
    time_t time;
    int trunk;
    byte LD_provider[20];
    byte calling_num[12];
    byte called_num[12]
}
```
— 104

(PRIOR ART)
FIG. 1B

```
struct genericCDR {
    int reckind;
    int recnum;
    byte calling_num[12];
    byte xyz[3];
    byte date[6];
    time_t time;
    int trunk;
    byte LD_provider[20];
    byte called_num[12];
}
```

FIG. 1C

```
struct CDR_type1 {
byte reckind[2];
byte recnum[2];
byte calling_num[12];
byte xyz[3];
#ifdef VERSION1
byte date[6];
#elif defined(VERSION2)
byte date[8];
#endif
time_t time;
}
```

```
struct CDR_type2 {
byte reckind[2];
byte recnum[2];
#ifdef VERSION2
byte location[10];
#endif
}
```

```
struct generic CDR {                    ⎫
    int reckind;                        |
    int recnum;                         | 206
    byte calling_num[12];               |
    byte called_num[12];                |
    byte xyz[3];                        |
    time_t time;                        ⎭
#ifdef VERSION1                         ⎫ 208
    byte date[6];                       ⎭
#elif defined(VERSION2)                 ⎫
    byte date[8];                       | 210
    byte location[10];                  ⎭
#endif
}
```
205

```
void BuildCDR (CDR_TYPE1 *rawCDR)
{
    genericCDR.reckind = cnv(rawCDR->reckind, 4);
    genericCDR.recnum = cnv(rawCDR->recnum, 4);
    memcpy (genericCDR.calling_num, rawCDR->calling_num, 12);
    memcpy (genericCDR.xyz, rawCDR->xyz, 3);
    memcpy (genericCDR.date, rawCDR->date, 6);
    genericCDR.time = Convert_Time (&rawCDR->time);
} void BuildCDR (CDR_TYPE2 *rawCDR)
{
    genericCDR.reckind = cnv(rawCDR->reckind, 4);
    genericCDR.recnum = cnv(rawCDR->recnum, 4);
    memcpy (genericCDR.date, rawCDR->date, 6);
    genericCDR.time = Convert_Time (&rawCDR->time);
    genericCDR.trunk = rawCDR->trunk;
    memcpy(genericCDR.LD_provider, rawCDR->LD_provider, 6);
    memcpy (genericCDR.calling_num, rawCDR->calling_num, 12);
    memcpy (genericCDR.called_num, rawCDR->called_num, 12);
}
```

FIG. 6

```
void RecoverCDR (CDR_TYPE1 *rawCDR)
{
    uncnv(rawCDR->reckind, genericCDR.reckind, 4);
    uncnv(rawCDR->recnum, genericCDR.recnum, 4);
    memcpy (rawCDR->calling_num, genericCDR.calling_num, 12);
    memcpy (rawCDR->xyz, genericCDR.xyz, 3);
    memcpy (rawCDR->date, genericCDR.date, 6);
    UnConvertTime (&rawCDR->time, genericCDR.time);
} void RecoverCDR (CDR_TYPE2 *rawCDR)
{
    uncnv(rawCDR->reckind, genericCDR.reckind, 4);
    uncnv(rawCDR->recnum, genericCDR.recnum, 4);
    memcpy (rawCDR->date, genericCDR.date, 6);
    UnConvertTime (&rawCDR->time, genericCDR.time);
    rawCDR->trunk = genericCDR.trunk;
    memcpy(rawCDR->LD_provider, genericCDR.LD_provider, 6);
    memcpy (rawCDR->calling_num, genericCDR.calling_num, 12);
    memcpy (rawCDR->called_num, genericCDR.called_num, 12);
}
```

FIG. 7

SYSTEM AND METHOD FOR GENERATING COMPUTER CODE TO FACILITATE DEVELOPMENT OF CDR MANAGEMENT TOOLS

BACKGROUND

1. Field of the Invention

The present invention relates generally to the field of telephone switching equipment. More specifically, the present invention relates to a tool for generating computer code to facilitate development of call detail record management tools.

2. Background of the Invention

A continuing problem faced by cellular telephone companies is monitoring activity on their cellular telephone networks. One consequence of the inability to effectively monitor activity in the system is the possibility that unbilled or otherwise unauthorized activity can occur on the network. This can happen for a number of reasons, including stolen service through a variety of cellular fraud schemes, billing mistakes due to incorrect entry of billing information, manufacturer errors in configuring telephone switches that lead to missed billing opportunities, errors in switch operating systems and poor management that results in improper billing for used services. Detecting such lost billing opportunities requires analysis of the activity of each telephone switch in the telephone network.

Telephone switches in cellular telephone systems typically generate one or more call detail records (CDRs). The CDRs include information related to every telephone call that the telephone switch generating the CDR has a part in handling. Exemplary information commonly found in CDRs includes information regarding the originator of the telephone call, including calling party number or a-number, and information regarding the called party, including dialed number, called number or b-number. In addition, CDR information generally includes the time the call was made, the duration of the call, the status of the call or termination code and any other desired information regarding a telephone call captured by the switch.

CDRs generated by switches manufactured by different manufacturers usually have different structures. For example, some switch manufacturers provide switches that use the same CDR structure for every telephone call handled by the switch. Other switch manufacturers provide switches that generate CDRs having different structures based on the type of telephone call. Differences in CDR structures can also exist in CDRs generated by different switches manufactured by the same manufacturer. For example, different CDR structures may be used for telephone calls originating on land-line telephones, telephone calls originating on cellular telephones, telephone calls terminating on land-line telephones and telephone calls terminating on cellular telephones.

Managing the large amount of information contained in CDRs efficiently requires development of new software CDR management tools. These management tools will be able to use the information in the CDRs to help better understand the dynamics of the cellular telephone system. The management tools have to access the CDRs produced by the switches in the cellular telephone system. Consequently, software that allows access of the CDRs has to be written for each new management tool. However, writing new software to access the information stored by cellular telephone switches for each new management tool that is developed is an inefficient process that is prone to error.

SUMMARY OF THE INVENTION

The present invention solves the foregoing problems in the art associated with developing new tools to process call detail records (CDRs) generated by telephone switches in cellular telephone networks by providing a system and method for generating computer software that can access CDR information output by a switch and can format that information for storage in a generic CDR that can be used to facilitate development of new CDR processing tools. In addition, the present invention can generate computer code to output information stored in a generic CDR in a raw CDR format. That is, the data stored in a generic CDR format can be output for storage in the same format that it was originally stored in when generated by a telephone switch.

In one embodiment, the present invention is a method for generating computer code that facilitates development of call detail record management tools. The method includes the steps of opening a computer code file to store generated computer code. A structure of a generic call detail record comprising a plurality of fields is read. A function header is written to the computer code file. Then for each field in the generic call detail record the method includes the step of generating a code segment. Each code segment generated is written to the computer code file. The computer code file is closed.

In another embodiment, the present invention is a system for generating computer code to facilitate development of call detail record management tools. The system comprises a generic call detail record format and at least one raw call detail record format. The raw call detail record formats correspond to raw call detail record formats that are to be encapsulated by the generic call detail record. A call detail record code generation tool inputs the raw call detail record format and the generic call detail record format. The call detail record generation tool generates computer code that will build a generic call detail record using the at least one raw call detail record format. Further, the system includes a file to store computer code that populates a generic call detail record format using data stored in at least one raw call detail record when executed.

DETAILED DESCRIPTION OF THE INVENTION

Call detail records (CDRs) generated by a telephone switch are generally stored to tape or disk in a raw CDR format. Typically, the CDR raw format is a binary format that is proprietary to each switch manufacturer. The variation in CDR structures and storage formats complicates writing general software to manage CDRs. Consequently, according to an embodiment of the present invention, a generic CDR structure is used. As described in more detail below, a generic CDR encapsulates one or more raw CDRs. The generic CDR structure facilitates development of new CDR management and processing techniques by relieving the developer from writing specific code to handle the many different raw CDR structures that exist. Thus, the use of the generic CDR structure allows the developer to concentrate on the development of a CDR management technique rather than the details of accessing CDR data.

According to an embodiment of the present invention, a generic CDR structure is a data structure that has a field corresponding to every field that can be present in any CDR produced by a switch of any one manufacturer. In an alternative embodiment of the present invention, the generic CDR structure can have a field corresponding to every field that can be present in any CDR produced by a switch of any manufacturer. That is, the generic CDR structure encapsulates the data found in one or more raw CDRs. During the process of converting one or more raw CDRs to a generic CDR, any field in the generic CDR that is not present in the raw CDR being converted is left blank or populated with a dummy value to indicate it is not a real value. The generic CDR structure is updated to reflect any changes in any CDR structure from the switch manufacturer for example, new versions of CDRs.

Figure 1A:
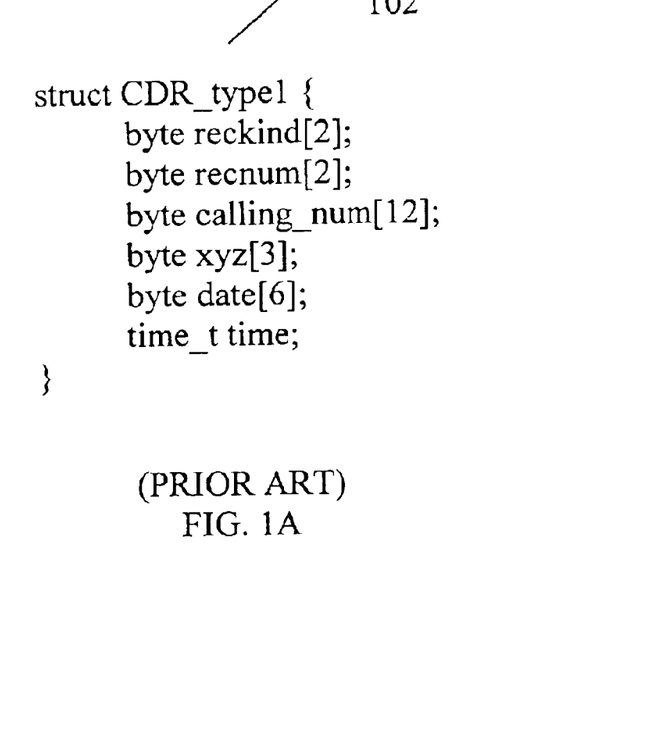
FIG. 1A is an exemplary proprietary CDR structure as might be in the prior art.
Figure 1B:
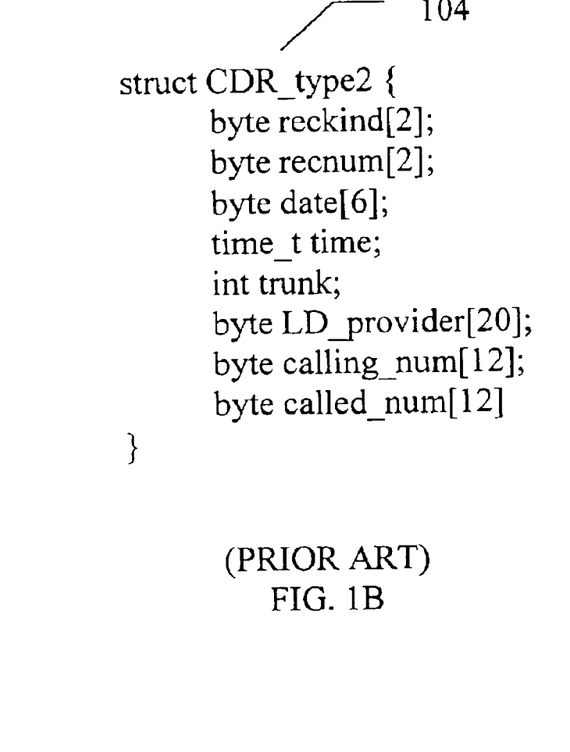
FIG. 1B is another exemplary proprietary CDR structure as might be in the prior art.
Figure 1C:
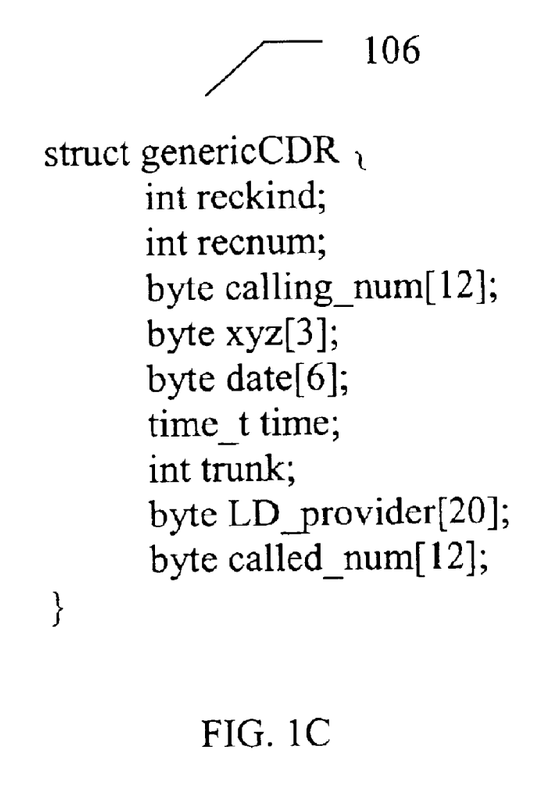
FIG. 1C is an exemplary generic CDR structure according to an embodiment of the present invention.

FIG. 1A is an exemplary CDR data structure 102 for a conventional raw CDR generated by a switch. FIG. 1B is an exemplary CDR data structure 104 for another conventional raw CDR that can be generated by the same switch. FIG. 1C illustrates a generic CDR structure 106 that is generated from the raw CDRs of FIGS. 1A and 1B according to an embodiment of the present invention. As can be seen generic CDR structure 106 has a field corresponding to every field that is found in either one of CDR structures 102 and 104.

In addition, type conversions may be made where required for compatibility with the generic CDR structure. For example, the recnum field is an array of bytes in the CDR structure 102. This data type is converted to an "int" data type in generic CDR structure 106. If conversion is necessary, as described below, the computer code generated by the present invention automatically includes calls to the appropriate conversion functions. Methods for performing any required data type conversions are well known to those skilled in the art. If no conversions are needed, the generated code comprises a memcpy( ) or variable assignment.

Figure 2A:
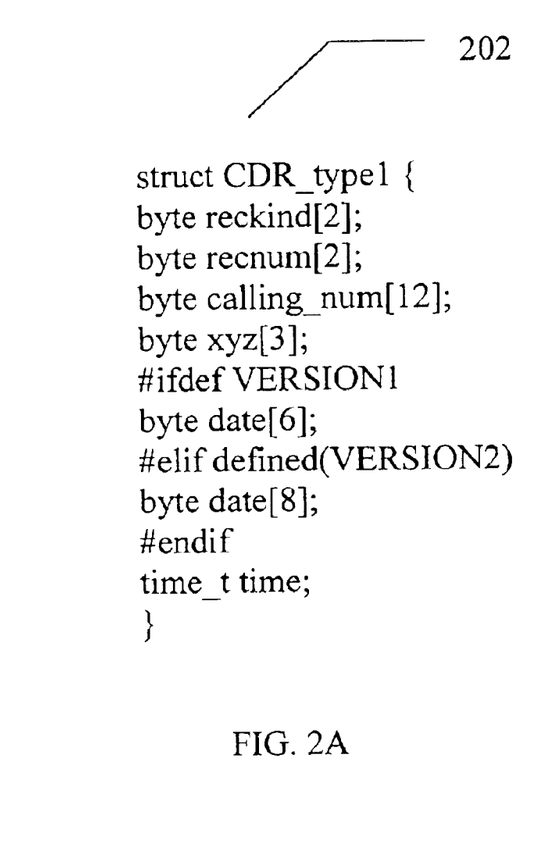
FIG. 2A is an exemplary raw CDR structure that incorporates preprocessor directives to conserve computer memory according to an embodiment of the present invention.

Switch manufacturers occasionally make changes to CDR definitions through new releases of their switch software. For example, raw CDR structure 202 shown in FIG. 2A illustrates a situation where a manufacturer increases the length of the "date" field in a second version of one of its switches. Raw CDR structure 202 illustrates a situation where the manufacturer added a "location" field in the second version of the switch.

To accommodate such changes efficiently and to preserve computer memory, preprocessor directives can be used. For example, memory efficiency can be enhanced using the #ifdef preprocessor directive when defining the generic CDR structure. Using the #ifdef preprocessor directive allows tailoring of the generic CDR structure to use only the memory required to encapsulate the CDRs generated by a particular switch version.

Figure 2B:
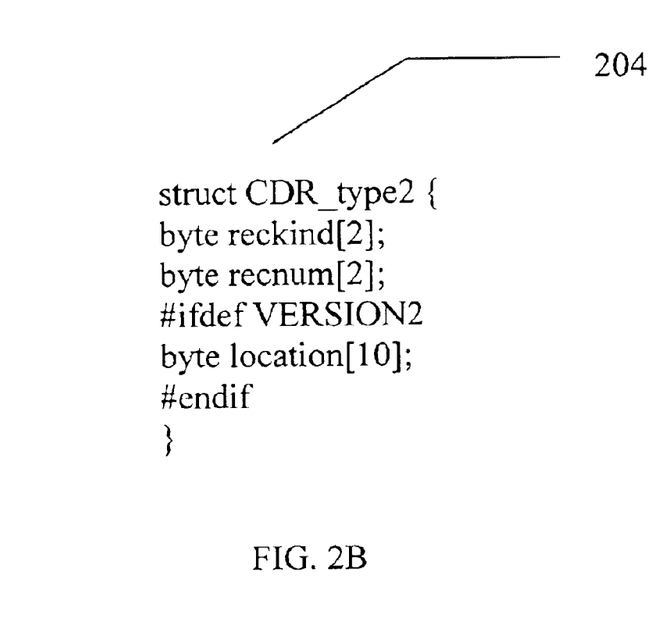
FIG. 2B is another exemplary raw CDR structure that incorporates preprocessor directives to conserve computer memory according to an embodiment of the present invention.
Figure 2C:
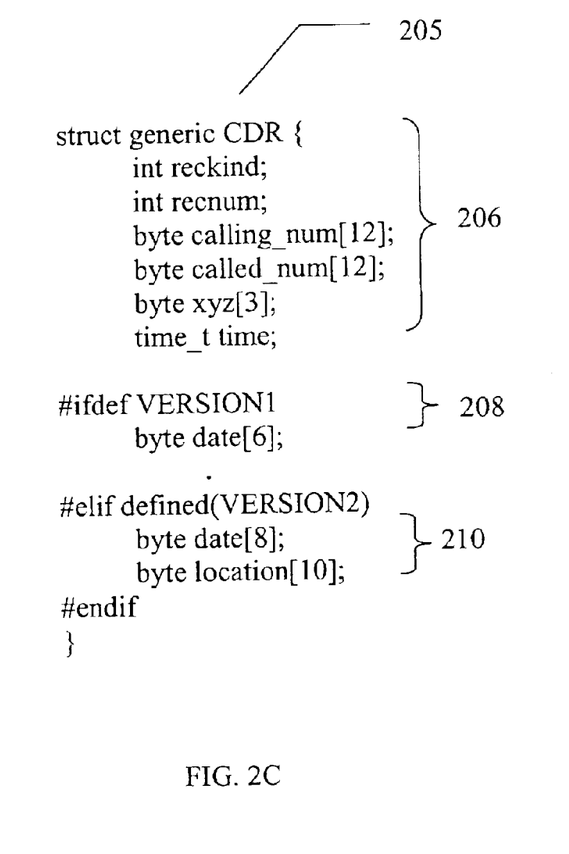
FIG. 2C is an exemplary generic CDR structure that uses preprocessor directives to conserve computer memory according to an embodiment of the present invention.

A generic CDR 205 (shown in FIG. 2C) is built using both raw CDR structures 202 and 204. Moreover, the present invention intelligently determines which fields are common to each version of the switch and which fields are unique to any version. Generic CDR 205 uses the #ifdef preprocessor directive to make more efficient use of the computer memory when declaring a generic CDR. Generic CDR 205 includes a common portion 206 and two unique portions 208 and 210. Common portion 206 is found in each version of structures 202 and 204. Specific portion 208 corresponds to the portion of raw CDR structures 202 and 204 unique to version 1 of the switch. Specific portion 210 corresponds to the portion of raw CDR structures 202 and 204 that is unique to version 2 of the switch.

Figure 3:
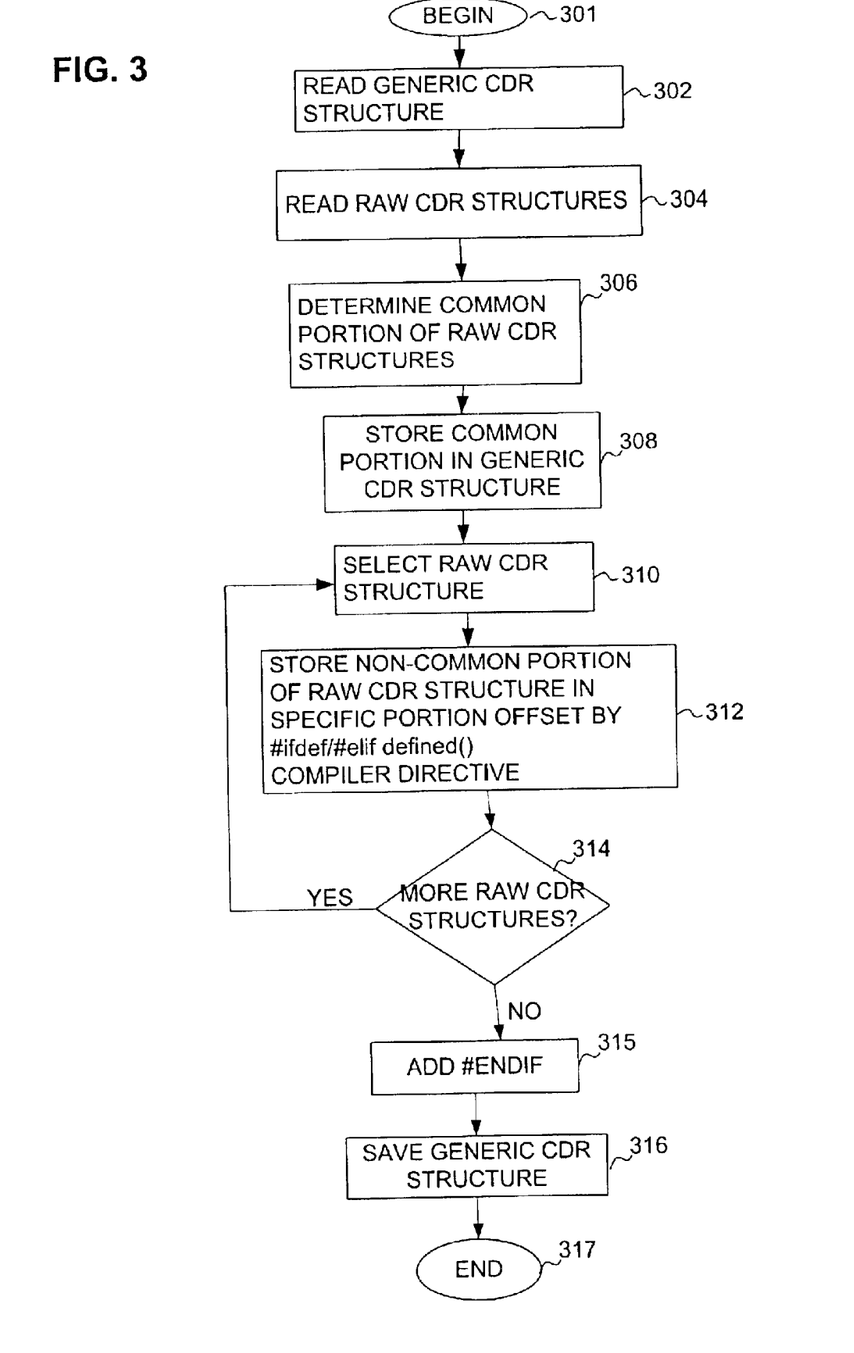
FIG. 3 is a flow chart for generating computer code to create a generic CDR according to an embodiment of the present invention.

A method for generating a generic CDR structure that incorporates using the #ifdef preprocessor directive is illustrated by the flow chart of FIG. 3. Processing begins in step 301. A generic CDR structure is read in step 302. This structure may be empty, in which case it will be created by this tool, or it may be created manually, or it may have been created during a previous use of this tool. Even if created by a previous use of this tool, it may be manually modified to change data types. The raw CDR structures of the CDRs that are to be encapsulated by the generic CDR are read in step 304. In step 306, a common portion among the read raw CDR structures is determined, if one exists. If a common portion is found, the common portion is added to the generic CDR in step 308. After completion of step 308, the generic CDR comprises a group of CDR fields that is common to each of the raw CDR structures that the generic CDR structure will encapsulate.

In step 310, the non-common portion of the selected raw CDR structure is added to the generic CDR structure offset by #ifdef or #elif defined( ) preprocessor directives in step 312. The preprocessor directive #ifdef is used if the raw CDR is the first CDR, otherwise the #elif preprocessor directive is used to offset the non-common portion of the raw CDR structure. In step 314, it is determined whether there are additional raw CDR structures to process. If there are additional raw CDR structures, processing continues in step 310 where another raw CDR structure is selected for processing.

If there are no additional raw CDRs, an #endif compiler directive is inserted in the generic CDR structure in step 315. The generic CDR structure is saved in step 316 and the method ends in step 317.

More complex generic CDRs that can be created using the #ifdef preprocessor directive would also fall within the scope and spirit of the present invention. For example, #ifdefs can be inserted into the generic CDR structure as required to handle interspersed differences between the raw CDR structures.

A generic CDR as described by the above processes can be generated either manually or automatically from the raw CDR data structures according to the method described above. An automatically generated generic CDR may be modified to change the data types of some fields. When this is done the tool will have to be rerun to properly generate the conversion code.

While the generic CDR structure is being created, as described below, the present invention generates source code that can access and extract the actual data from one or more raw CDRs generated by cellular telephone switches. Preferably, the raw CDRs are stored on a storage device such as a disk. The generated source code extracts the data from one or more raw CDRs and stores it in a variable having the data structure of the generic CDR.

Figure 4:
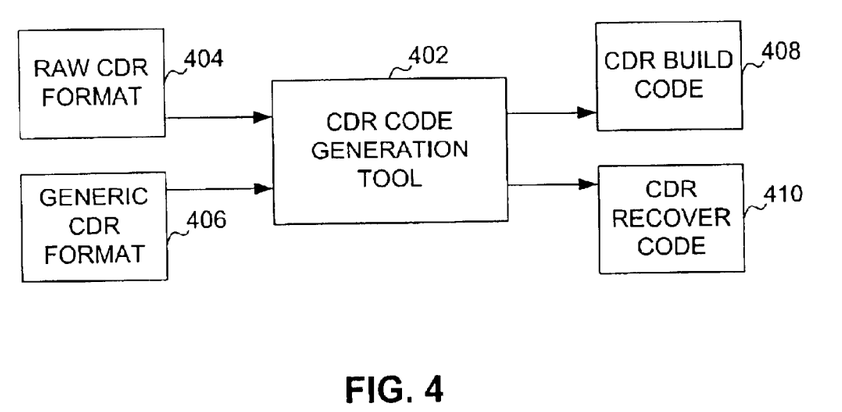
FIG. 4 is a schematic diagram for a system for generating computer code to build a generic CDR from data stored in raw CDRs and to recover raw CDRs from data stored in a generic CDR.

FIG. 4 is a schematic illustration of a system for generating computer code to assist in the development of CDR management tools according to an embodiment of the present invention. A CDR computer code generation tool 402 inputs a raw CDR format 404 and a generic CDR format 406. In the present description, the terms structure and format are used interchangeably to indicate any format for a generic call detail record or a raw call detail record. For example, exemplary raw CDR formats are illustrated by the computer structure definitions 102, 104, 203 and 204. Exemplary generic CDR formats are illustrated by the computer structure definitions shown in FIGS. 202 and 205.

Generic CDR format 406 is designed to encapsulate raw CDR format 404. Using the input raw CDR format and the generic CDR format, CDR code generation tool 402 generates CDR build code 408 and CDR recover code 410. As described below, CDR build code 408 is used to build a generic CDR from information stored in a raw CDR. As described below, CDR recover code 410 is used to recover a raw CDR from data stored in a generic CDR.

Figure 5A:
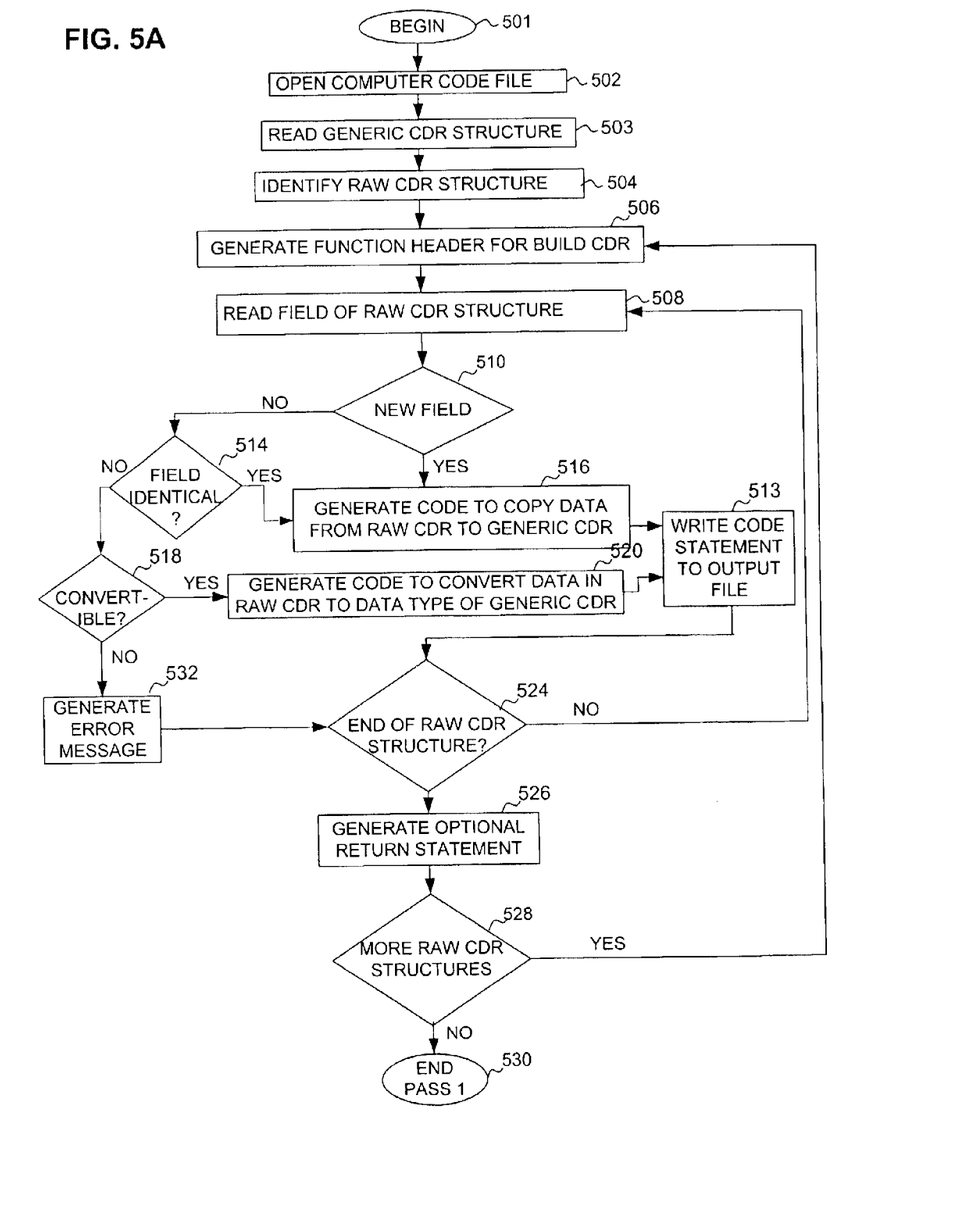
FIG. 5A is a flow chart for a method for generating computer code to populate a generic CDR with data from one or more raw CDRs according to an embodiment of the present invention.
Figure 5B:
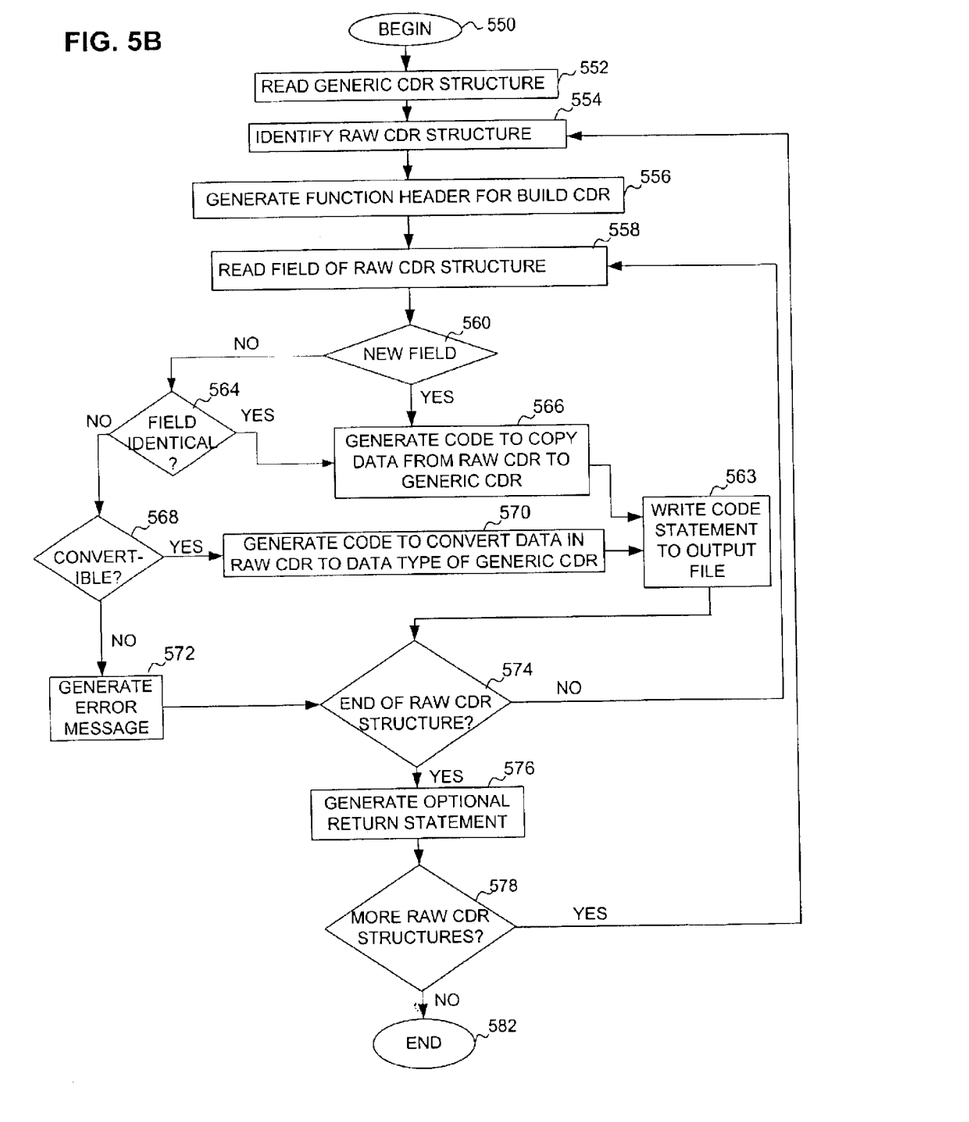
FIG. 5B is a flow chart for a method for generating computer code to populate a raw CDR with data from a generic CDR according to an embodiment of the present invention.

A method for generating computer code to populate a generic CDR using data from one or more raw CDRs or to recover a raw CDR from data in the generic CDR structure is provided in the flow charts of FIGS. 5A and 5B. Preferably, the method proceeds in two passes. The first pass, illustrated in the flow chart of FIG. 5A. The first pass of the method generates BuildCDR functionality. The BuildCDR function is computer code that, when executed, populates a generic CDR using data read from one or more previously stored raw CDRs. The second pass generates RecoverCDR functionality. The RecoverCDR function is computer code that, when executed, recreates a raw CDR for a particular switch CDR format using data stored in a generic CDR. Preferably, pass 2 is executed immediately after pass 1. However, in an alternate embodiment of the present invention, each pass is executed separately and independently of the time of execution of the other pass.

FIG. 5A is a flow chart for a method for generating BuildCDR functionality to populate a generic CDR with data from one or more raw CDRs. The method begins in step 501. A computer code file is opened in step 502. The computer code file is used to store the computer code generated by the method described in FIGS. 5A and 5B.

In step 503, a generic CDR structure is read. The name, type and size of each field in the generic CDR structure is stored in computer memory. In step 504, a raw CDR data structure is identified. Preferably, the generic and one or more raw CDR structures are stored in header file. The header file is opened and the data required to complete steps 503 and 504 is read. In addition, preferably, the header file is configured such that the generic CDR structure is first.

In step 506, a function header is generated and stored to the computer code file. In the first pass, the function header is the function header for a BuildCDR function. A form for the BuildCDR function header according to one embodiment of the present invention is "void BuildCDR (CDR_type1 *rawCDR)", where CDR_type1 indicates CDR type, for example, switch version and raw CDR is a pointer to a data structure defined according the CDR version. In step 508, a field of a raw CDR is read. The field can be read from the header file or from memory if the raw CDR is stored in memory when it is identified in step 504. In step 510, the read field is compared to the fields in the generic CDR structure to determine if it is a new field. A new field is a field that is not already present in the generic CDR structure. If the field is a new field, the method continues in step 516, with the step of generating computer code that, when executed, will cause data stored in the raw CDR field to be stored in the corresponding generic CDR field. Preferably, the method continues in step 513 with the step of writing the computer code so generated to the computer code file. Alternatively, the generated computer code is stored in memory and written to the computer code file later.

If the read raw CDR field is not new, the method continues in step 514 with the step of determining whether the field is identical to a field in the generic CDR. Two fields are identical if they have the same name, data type and size. If the fields are identical, the method continues in step 516, with the step of generating computer code that, when executed, will cause data stored in the raw CDR field to be copied to the corresponding generic CDR field. Copying in this instance is accomplished using either a variable assignment or memcpy( ) function. Preferably, the method continues in step 513 with the step of writing the computer code so generated to the computer code file. Alternatively, the generated computer code is stored in memory and written to the computer code file later.

If the read raw CDR field is not identical, the method continues in step 518 with the step of determining whether the field is compatible with a field in the generic CDR. A field is compatible with another field if its data type can be converted to match the data type of the other field. If the read raw CDR field is compatible with a field in the generic CDR, the method continues in step 520, with the step of generating computer code that, when executed, will cause data stored in the raw CDR field to be converted to the compatible generic CDR field. Preferably, the computer code generated is a function call to computer code that will perform the actual conversion. As described above, it would be apparent to those skilled in the art how to write such conversion code. Preferably, the method continues in step 513 with the step of writing the computer code so generated to the computer code file. Alternatively, the generated computer code is stored in memory and written to the computer code file later.

If the read field is not compatible, then the method continues in step 522 with the step of generating an error message. The error message indicates, that the read raw CDR field was not new, nor identical nor compatible with any field in the generic CDR structure indicating that it requires special consideration.

After the generated code segment has been written in step 513, or alternatively stored in memory or an error message is generated in step 522, the method continues processing in step 524 by determining whether the end of the raw CDR structure being processed has been reached. For example, when using C or C++, the end of the structure is reached upon encountering a "}". If the end of the raw CDR structure has not been reached, the method continues in step 508, by reading the next field of the raw CDR structure.

If the end of the raw CDR structure has been reached, the method optionally continues in step 526 with the generation of a return statement that is written to the computer code file. Whether performing step 526 or not, the method continues in step 528 by determining whether there is another raw CDR structure to process. If there are additional raw CDR structures to process, the method continues in step 504 by identifying the next raw CDR structure to process. If there are no more raw CDR structures to process, the method ends pass 1 in step 530. Optionally, at this point, the method can close the computer code file. However, it is preferably left open for use in the second pass.

FIG. 5B is a flow chart for a method for generating RecoverCDR functionality to populate a generic CDR with data from one or more raw CDRs. Preferably, the flow chart illustrated in FIG. 5B is executed as the second pass of the method described above. The second pass of the method begins in step 550. If the computer code file was closed at the end of the first pass, it is opened. Preferably, however, the computer code file is not closed at the end of the first pass, and the second pass is initiated immediately upon completion of the first pass.

In step 552, a generic CDR structure is read. The name, type and size of each field in the generic CDR structure is stored in computer memory. In step 554, a raw CDR data structure is identified. Preferably, the generic and one or more raw CDR structures are stored in header file. The header file is opened and the data required to complete steps 553 and 554 is read. In addition, preferably, the header file is configured such that the generic CDR structure is first.

In step 556, a function header is generated and stored to the computer code file. In the second pass, the function header is the function header for a RecoverCDR function. A form for the RecoverCDR function header according to one embodiment of the present invention is the form "void RecoverCDR (CDR_type1 *rawCDR)", where CDR_type1 indicates CDR type, for example, switch version and rawCDR is a pointer to a data structure defined according the CDR version. In step 558, a field of a raw CDR is read. The field can be read from the header file or from memory if the raw CDR is stored in memory when it is identified in step 554. In step 560, the read field is compared to the fields in the generic CDR structure to determine if it is a new field. A new field is a field that is not already present in the generic CDR structure. If the field is a new field, the method continues in step 566, with the step of generating computer code that, when executed, will cause data stored in the corresponding generic CDR field to be stored in the raw CDR field. Preferably, the method continues in step 563 with the step of writing the computer code so generated to the computer code file. Alternatively, the generated computer code is stored in memory and written to the computer code file later.

If the read raw CDR field is not new, the method continues in step 564 with the step of determining whether the field is identical to a field in the generic CDR. Two fields are identical if they have the same name, data type and size. If the fields are identical, the method continues in step 566, with the step of generating computer code that, when executed, will cause data stored in the corresponding generic CDR field to be copied to the raw CDR field. Copying in this instance is accomplished using either a variable assignment or memcpy( ) function. Preferably, the method continues in step 563 with the step of writing the computer code so generated to the computer code file. Alternatively, the generated computer code is stored in memory and written to the computer code file later.

If the read raw CDR field is not identical, the method continues in step 518 with the step of determining whether the field is compatible with a field in the generic CDR. A field is compatible with another field if its data type can be converted to match the data type of the other field. If the read raw CDR field is compatible with a field in the generic CDR, the method continues in step 570, with the step of generating computer code that, when executed, will cause data stored in the compatible generic CDR field to be converted to the raw CDR field. Preferably, the computer code generated is a function call to computer code that will perform the actual conversion. As described above, it would be apparent to those skilled in the art how to write such conversion code. Preferably, the method continues in step 563 with the step of writing the computer code so generated to the computer code file. Alternatively, the generated computer code is stored in memory and written to the computer code file later.

If the read field is not compatible, then the method continues in step 572 with the step of generating an error message. The error message indicates, that the read raw CDR field was not new, nor identical nor compatible with any field in the generic CDR structure indicating that it requires special consideration.

After the generated code segment has been written in step 563, or alternatively stored in memory or an error message is generated in step 572, the method continues processing in step 574 by determining whether the end of the raw CDR structure being processed has been reached. For example, when using C or C++, the end of the structure is reached upon encountering a "}". If the end of the raw CDR structure has not been reached, the method continues in step 558, by reading the next field of the raw CDR structure.

If the end of the raw CDR structure has been reached, the method optionally continues in step 576 with the generation of a return statement that is written to the computer code file. Whether performing step 576 or not, the method continues in step 578 by determining whether there is another raw CDR structure to process. If there are additional raw CDR structures to process, the method continues in step 554 by identifying the next raw CDR structure to process. If there are no more raw CDR structures to process, ends the second pass in step 582.

The computer code file can be closed at this point. However, preferably additional processing can be performed upon completion of the second pass prior to closing the computer code file. Specifically, at the end of the second pass, a revised generic CDR is generated and written to the computer code file. The revised generic CDR is generated by printing the type, size, and name information for each field found in the original generic CDR and those that were added by processing the raw CDR structures in the first pass. Further, in one embodiment of the present invention, the type, size, and name information from the revised generic CDR is printed to the computer code file in a format that is compatible with the structure used by a CDR viewing tool. At this point the computer code file is closed.

One such CDR viewing tool is described in U.S. patent application Ser. No. 10/094,640, entitled "System and Method for Managing CDR Information", filed on Mar. 12, 2002, which is hereby incorporated by reference in its entirety. The CDR viewing tool uses this information to permit a user to select what fields to view and to determine the best format for displaying this information.

It would be apparent to those skilled in the art that if original generic CDR structure was empty, one would be created that would contain every field found in any of the raw CDR structures. No conversions would be generated unless the field exists in two (or more) raw CDR structures with different formats. If the user wants to force some conversions to be done, the fields to be converted must exist in the generic CDR structure with the appropriate type prior to using this tool.

If preprocessor directives are found that are not specifically recognized, these preprocessor directives are duplicated in the output file at the point at which they are encountered. For example, if a portion of the raw CDR is optional (based on some condition that can be determined at compile time), the code to copy or convert these fields will be optional based on the same conditions.

Figure 6:
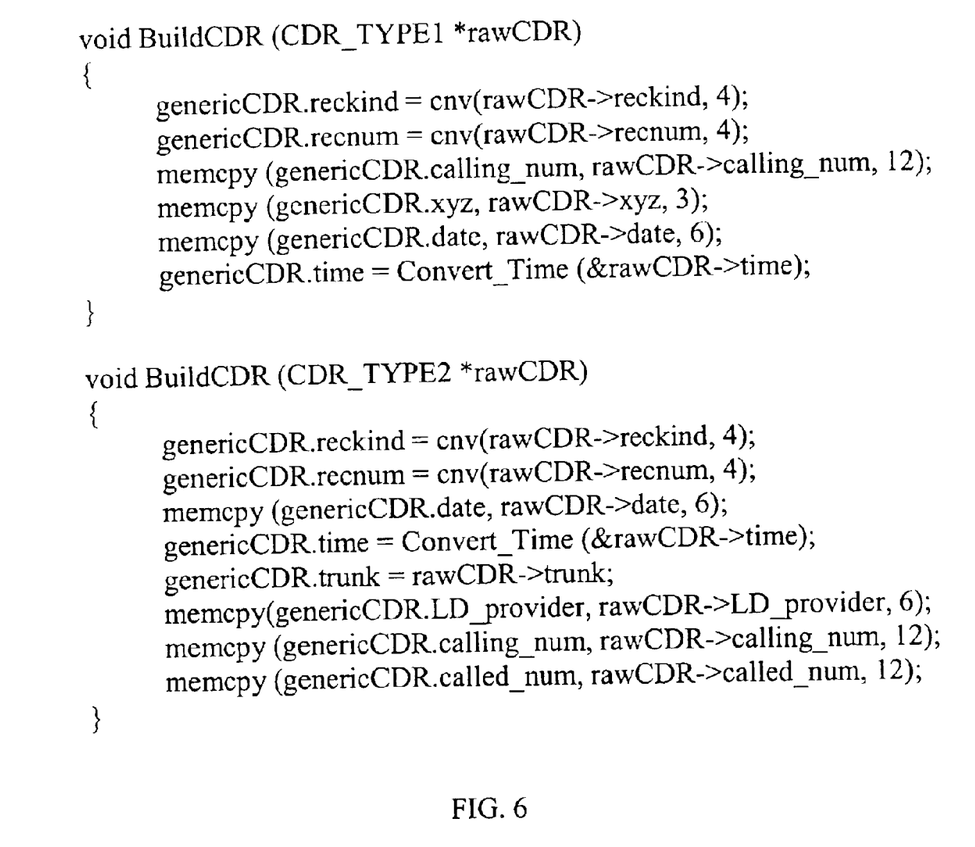
FIG. 6 is exemplary computer code to build a generic CDR from raw CDRs as generated by an embodiment of the present invention.

FIG. 6 is exemplary CDR build code that is generated by CDR code generator tool 402. As shown in FIG. 6, the computer code that is generated builds a generic CDR using the data from a raw CDR. The data stored in the raw CDR is obtained earlier by opening a CDR data file that was generated by a switch, and storing the data contained therein. Therefore, the variable "rawCDR" is defined prior to the code generation shown in FIG. 6. That is, the variable "rawCDR" is defined and initialized prior to the BuildCDR function, illustrated in FIG. 6, being invoked. "rawCDR" is passed as a parameter to BuildCDR, which uses the data contained therein to populate the generic CDR.

FIG. 6 also illustrates the use of the function overload feature available in many programming languages. Using function overload, the function name BuildCDR can be reused, so long as the proper parameters are passed to each function. In the embodiment illustrated in FIG. 6, for example, the function BuildCDR is overloaded so that it can build generic CDRs for type1 and type 2 CDRs. The particular function that will be invoked at runtime depends on whether the function is called with a pointer to a CDR_TYPE1 or a CDR_TYPE2 structure.

In an embodiment of the present invention, CDR code generation tool 402 accesses a set of built in conversion rules to obtain the code segments required to create the BuildCDR function that it generates. If any data type conversions are required, subroutines to perform the conversions are referenced in the computer code segments. For example, the subroutines "cnv( )" and "Convert_Time( )" are used to perform data type conversions on the data of the raw CDR to store in the generic CDR.

Figure 7:
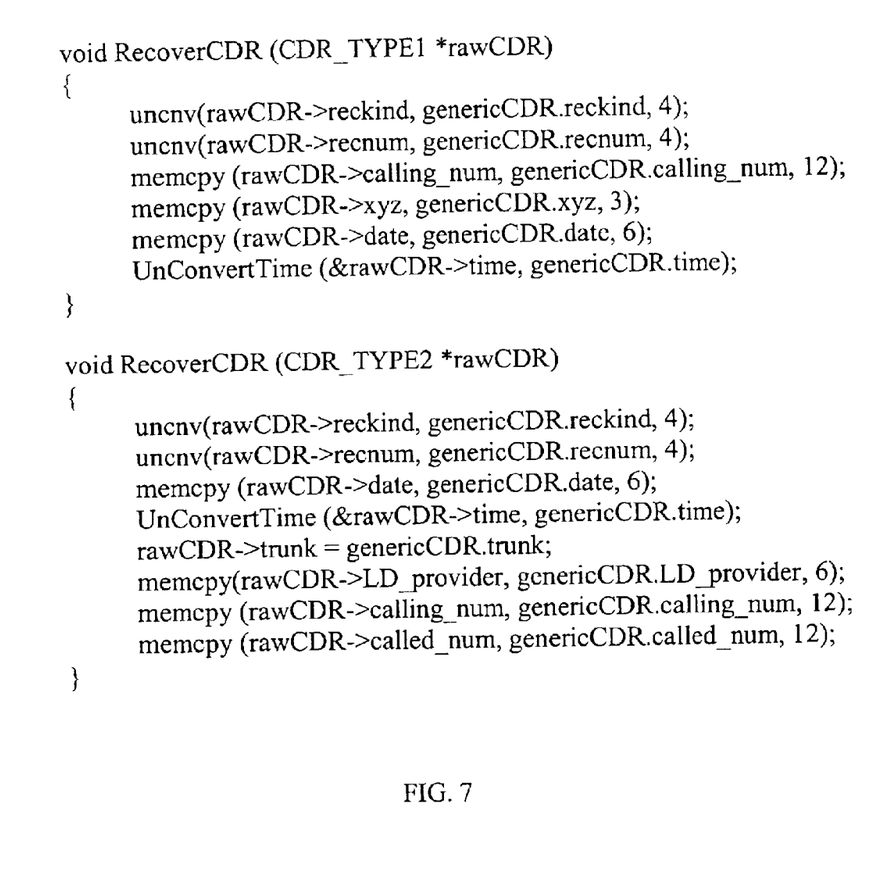
FIG. 7 is exemplary computer code to recover a raw CDR from a generic CDR as generated by an embodiment of the present invention.

CDR code generation tool 402 also generates code that converts a generic CDR to a raw CDR corresponding to a particular CDR type. FIG. 7 is exemplary code that is generated by CDR code generator tool 402 to recover a raw CDR using the data stored in a generic CDR. As with FIG. 6 above, FIG. 7 illustrates the use of the function overload feature of many programming languages. Using function overload, the function name RecoverCDR can be reused, so long as the proper parameters are passed to each function. In the embodiment illustrated in FIG. 7, for example, the function RecoverCDR is overloaded so that it can recover raw CDRs for two CDR types from a generic CDR. The particular function that will be invoked at runtime depends on whether a pointer to a CDR_TYPE1 or a CDR_TYPE2 structure is used.

If any reverse conversion back to the raw CDR data types are required, subroutines to perform the reverse conversions are referenced in the computer code segment. For example, subroutines "uncnv( )" and "UnConvertTime( )" are used to convert parameters back to the data types for storage in the raw CDR.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer implemented method executing on a computer for generating computer code that facilitates development of call detail record management tools, comprising:

opening a computer code file to store generated computer code;

reading a structure of a generic call detail record, the generic call detail record comprising a plurality of fields;

writing a function call to the computer code file;

generating a code segment for each field in a raw call detail record;

storing each code segment to the computer code file;

closing the computer code file;

creating the generic call detail record from a plurality of raw call detail records;

reading each raw call detail record structure to be encapsulated in the generic call detail record;

determining a common portion among the fields available to different versions of a switch; and for each version of the raw call detail record structure to be encapsulated in the generic call detail record structure, storing an uncommon portion of the raw call detail record structure in a generic call detail record structure offset in a manner to indicate that it is distinct to correspond to the particular switch version.

2. The method recited in claim 1, further comprising:

reading each call detail record structure corresponding to each raw call detail record structure to be encapsulated by the generic call detail record structure; and for each raw call detail record structure, adding to the generic call detail record structure each field of the raw call detail record that does not match a field in the generic call detail record structure.

3. The method recited in claim 2, wherein processing of each raw call detail record structure is performed prior to reading next call raw detail record for processing.

4. The method recited in claim 1, further comprising:
if there is a common portion among the fields available to different versions of a switch, storing the common portion in the generic call detail record structure.

5. The method recited in claim 1, further comprising using #ifdef and #elif compiler directives to offset the uncommon portions.

6. The method recited in claim 1, further comprising computer-executable instructions stored thereon which, when executed by a computer, cause the computer to write a return statement to the computer code file.

7. A system executing on a computer for generating computer code that facilitates development of call detail record management tools, comprising:
means for opening a computer code file to store generated computer code;
means for reading a structure of a generic call detail record, the generic call detail record comprising a plurality of fields;
means for writing a function call to the computer code file;
for each field in the generic call detail record, means for generating a code segment;
means for writing each code segment to the computer code file;
means for closing the computer code file;
means for creating the generic call detail record from a plurality of raw call detail records;
means for reading each raw call detail record structure to be encapsulated in the generic call detail record;
means for determining a common portion among the fields available to different versions of a switch; and
for each version of the raw call detail record structure to be encapsulated in the generic call detail record structure, means for storing an uncommon portion of the raw call detail record structure in the generic call detail record structure offset in a manner to indicate that it is distinct to correspond to the particular switch version.

8. The system recited in claim 7, further comprising:
means for reading the generic call detail record structure;
means for reading each call detail record structure corresponding to each raw call detail record structure to be encapsulated by the generic call detail record structure; and
for each raw call detail record structure, means for adding to the generic call detail record structure each field of the raw call detail record that does not match a field in the generic call detail record structure.

9. The system recited in claim 8, wherein processing of each raw call detail record structure is performed prior to reading a next call raw detail record for processing.

10. The system recited in claim 7, further comprising:
means for storing the common portion in the generic call detail record structure.

11. The system recited in claim 7, further comprising means for using #ifdef and #elif compiler directives to offset the uncommon portions.

12. A computer-readable medium having stored thereon computer-executable instructions which, when, executed by a computer, cause the computer to:
open a computer code file to store generated computer code;
read a structure of a generic call detail record, the generic call detail record comprising a plurality of fields;
write a function call to the computer code file;
generate a code segment for each field in a raw call detail record;
store each code segment to the computer code file;
close the computer code file;
create the generic call detail record from plurality of raw call detail records;
read each raw call detail record structure to be encapsulated in the generic call detail record;
determine a common portion among fields available to different versions of a switch; and
for each version of a raw call detail record structure to be encapsulated in the generic call detail record structure, store an uncommon portion of the raw call detail record structure in the generic call detail record structure offset in a manner to indicate that it is distinct to correspond to the particular switch version.

13. The computer-readable medium recited in claim 12, further comprising computer-executable instructions stored thereon which, when executed by a computer, cause the computer to:
read the generic call detail record structure;
read each call detail record structure corresponding to each raw call detail record structure to be encapsulated by the generic call detail record structure; and
for each raw call detail record structure, add to the generic call detail record structure each field of the raw call detail record that does not match a field in the generic call detail record structure.

14. The computer-readable medium recited in claim 13, wherein processing of each raw call detail record structure is performed prior to reading a next call raw detail record for processing.

15. The computer-readable medium recited in claim 12, further comprising computer-executable instructions stored thereon which, when executed by a computer, cause the computer to:
if there is a common portion determined among the fields available to different versions of a switch, store the common portion in the generic call detail record structure.

16. The computer-readable medium recited in claim 12, further comprising computer-executable instructions stored thereon which, when executed by a computer, cause the computer to use #ifdef and #elif compiler directives to offset the uncommon portions.

17. The computer-readable medium recited in claim 12, further comprising computer-executable instructions stored thereon which, when executed by a computer, cause the computer to write a return statement to the computer code file.

* * * * *